United States Patent
Shen et al.

(10) Patent No.: US 8,108,576 B2
(45) Date of Patent: Jan. 31, 2012

(54) DONGLE MODULE, CONSOLE MODULE, MATRIX KVM SWITCH SYSTEM, LOCAL-END MODULE, REMOTE-END MODULE, AND EXTENDER SYSTEM

(75) Inventors: Fu-Chin Shen, Keelung (TW); Chia-Hsien Tang, Taipei (TW)

(73) Assignee: Aten International Co., Ltd., Shijr (TW)

( * ) Notice: Subject to any disclaimer, the term of this patent is extended or adjusted under 35 U.S.C. 154(b) by 183 days.

(21) Appl. No.: 12/579,579

(22) Filed: Oct. 15, 2009
(Under 37 CFR 1.47)

(65) Prior Publication Data
US 2010/0095031 A1    Apr. 15, 2010

(30) Foreign Application Priority Data

Oct. 15, 2008  (TW) ............................... 97139625 A (51) Int. Cl.
*G06F 13/10* (2006.01)
(52) U.S. Cl. ............................................. 710/72; 710/62
(58) Field of Classification Search .................. None
See application file for complete search history.

(56) References Cited

U.S. PATENT DOCUMENTS

| | | | | |
|---|---|---|---|---|
| 7,321,946 B2 * | 1/2008 | Olson | ............................ | 710/300 |
| 7,500,032 B2 * | 3/2009 | Kim et al. | ........................ | 710/72 |
| 7,769,940 B2 * | 8/2010 | Wiler | ............................ | 710/316 |
| 7,774,523 B2 * | 8/2010 | Chen et al. | ........................ | 710/62 |
| 7,826,710 B2 * | 11/2010 | Itani | ............................... | 386/343 |
| 7,836,223 B2 * | 11/2010 | Butcher | ........................ | 710/31 |
| 7,852,873 B2 * | 12/2010 | Bird | ............................... | 370/463 |
| 2007/0280282 A1 * | 12/2007 | Tzeng et al. | ................... | 370/464 |
| 2008/0195777 A1 * | 8/2008 | Dickens et al. | ................... | 710/62 |
| 2008/0201756 A1 * | 8/2008 | Shakiba et al. | ................. | 725/119 |
| 2008/0309584 A1 * | 12/2008 | Zhang | ................................ | 345/5 |
| 2009/0013095 A1 * | 1/2009 | Butcher | ........................ | 710/11 |
| 2009/0052208 A1 * | 2/2009 | Li | ..................................... | 363/13 |
| 2009/0177901 A1 * | 7/2009 | Chen et al. | ..................... | 713/310 |
| 2009/0245345 A1 * | 10/2009 | Lee et al. | ................. | 375/240.01 |
| 2010/0023660 A1 * | 1/2010 | Liu | ................................. | 710/71 |

FOREIGN PATENT DOCUMENTS

TW        200803487        1/2008

OTHER PUBLICATIONS

English language translation of abstract of TW 200803487(published Jan. 1, 2008).

* cited by examiner

*Primary Examiner* — Cheng-Yuan Tseng
(74) *Attorney, Agent, or Firm* — Chen Yoshimura LLP (57) ABSTRACT

A dongle module including a digital video differential signal input terminal, a keyboard control signal I/O terminal, a mouse control signal I/O terminal, a processing unit, a transforming unit, a synthesizer unit and a signal I/O terminal is provided. The digital video differential input terminal receives a digital video differential signal, which includes multiple differential data signals, a differential clock signal and multiple low-frequency signals. The processing unit processes the low-frequency signal, a keyboard control signal and a mouse control signal to obtain a digital hybrid data. The transforming unit transforms the digital hybrid data into a differential hybrid signal. The synthesizer unit receives and composes the differential clock signal and the differential hybrid signal into a differential synthesized signal. The signal I/O terminal receives and outputs the differential data signals and the differential synthesized signal.

19 Claims, 6 Drawing Sheets

DONGLE MODULE, CONSOLE MODULE, MATRIX KVM SWITCH SYSTEM, LOCAL-END MODULE, REMOTE-END MODULE, AND EXTENDER SYSTEM

This application claims the benefit of Taiwan application Serial No. 97139625, filed Oct. 15, 2008, the subject matter of which is incorporated herein by reference.

BACKGROUND OF THE INVENTION

1. Field of the Invention

The invention relates in general to a dongle module, a console module, a matrix KVM switch system, a local-end module, a remote-end module, and a signal extender system, and more particularly to a dongle module, a console module, a matrix KVM switch system, a local-end module, a remote-end module, and a signal extender system which are capable of transmitting a digital video differential signal and a peripheral signal via a single network cable at long distance to save cost.

2. Description of the Related Art

High definition multimedia interface (HDMI) is a complete digitalized audio/video transmission interface for transmitting uncompressed audio signal and video signal. HDMI technology is now widely used in compatible devices such as DVD player, personal computer, TV game station, digital Hi-Fi player and TV. An HDMI connector normally has 19~29 pins for simultaneously transmitting an HDMI signal including an audio signal and a video signal. The HDMI signal is transmitted via a single HDMI cable, hence simplifying the system installation. However, for the matrix KVM switch system or the signal extender system, to transmit the HDMI signal via the HDMI cable implies that the cost of the overall system will be greatly increased. If the HDMI signal is transmitted via a network cable, then the matrix KVM switch system or the signal extender system requires more than two network cables to transmit the complete HDMI signal, resulting in inconvenience in system installation.

SUMMARY OF THE INVENTION

The invention is directed to a dongle module, a console module, a matrix KVM switch system, a local-end module, a remote-end module, and a signal extender system. The complete digital video differential signal is transmitted via one single network cable, so that the cost of the overall system is greatly reduced. The abovementioned digital video differential signal at least includes a high definition multimedia interface (HDMI) signal, a digital visual interface (DVI) signal and a DisplayPort signal.

According to a first aspect of the present invention, a dongle module is provided. The dongle module includes a digital video differential signal input terminal, a keyboard control signal I/O terminal, a mouse control signal I/O terminal, a processing unit, a transforming unit, a synthesizer unit and a signal I/O terminal. The digital video differential input terminal receives a digital video differential signal, which includes multiple differential data signals, a differential clock signal and a low-frequency signal. The keyboard control signal I/O terminal receives a keyboard control signal. The mouse control signal I/O terminal receives a mouse control signal. The processing unit processes the low-frequency signal, the keyboard control signal and the mouse control signal to obtain a digital hybrid data. The transforming unit further transforms the digital hybrid data into a differential hybrid signal. The synthesizer unit receives and composes the differential clock signal and the differential hybrid signal into a differential synthesized signal. The signal I/O terminal receives and outputs the differential data signals and the differential synthesized signal.

According to a second aspect of the present invention, a console module is provided. The console module includes M signal I/O terminals, N I/O terminal sets, a switch, N equalizers, N separating units, N transforming units and a processing unit, wherein M and N are positive integers. The M signal I/O terminals correspondingly receive M differential composite signals, each including multiple differential data signals and a differential composition signal. Each I/O terminal set includes a digital video differential signal output terminal, a keyboard control signal I/O terminal and a mouse control signal I/O terminal. The switch selects N differential composite signals from the M differential composite signals. The N equalizers correspondingly compensate the N differential composite signals, and respectively output the differential data signals of the N differential composite signals to the digital video differential signal output terminal of a corresponding I/O terminal set. The N separating units correspondingly receive N differential synthesized signals of N differential composite signals from the N equalizers, and respectively separate each received differential synthesized signal into a differential clock signal and a differential hybrid signal, and outputs the differential clock signal to the digital video differential signal output terminal of the corresponding I/O terminal set. The N transforming units correspondingly transform the N differential hybrid signals outputted from the N separating units into N digital hybrid data. The processing unit receives the N digital hybrid data, and further processes each digital hybrid data to obtain a low-frequency signal, a keyboard control signal and a mouse control signal, and respectively outputs the low-frequency signal, the keyboard control signal and the mouse control signal to the digital video differential signal output terminal, the keyboard control signal I/O terminal and the mouse control signal I/O terminal of the corresponding I/O terminal set.

According to a third aspect of the present invention, a matrix KVM switch system is provided. The matrix KVM switch system includes M dongle modules and a console module, wherein M is a positive integer. Each dongle module transforms a digital video differential signal, a keyboard control signal and a mouse control signal, which are received from a corresponding host, into a differential composite signal. The console module has M signal I/O terminals and N I/O terminal sets. The M signal I/O terminals are respectively coupled to the M dongle modules via M network cables, and the N I/O terminal sets are respectively coupled to the N console devices, wherein N is a positive integer. Each dongle module outputs the differential composite signal to a corresponding signal I/O terminal via a corresponding network cable. The console module selects N differential composite signals from M differential composite signals and further transforms each differential composite signal into the digital video differential signal, the keyboard control signal and the mouse control signal, which are outputted to a corresponding console device via a corresponding I/O terminal set.

According to a fourth aspect of the present invention, a local-end module is provided. The local-end module includes a digital video differential signal input terminal, a keyboard control signal I/O terminal, a mouse control signal I/O terminal, a processing unit, a transforming unit, a synthesizer unit and a signal I/O terminal. The digital video differential signal input terminal receives a digital video differential signal, which includes multiple differential data signals, a differential clock signal and a low-frequency signal. The keyboard control signal I/O terminal receives a keyboard control signal. The mouse control signal I/O terminal receives a mouse control signal. The processing unit processes the low-frequency signal, the keyboard control signal and the mouse control signal to obtain a digital hybrid data. The transforming unit further transforms the digital hybrid data into a differential hybrid signal. The synthesizer unit receives and composes the differential clock signal and the differential hybrid signal into a differential synthesized signal. The signal I/O terminal receives and outputs the differential data signals and the differential synthesized signal.

According to a fifth aspect of the present invention, a remote-end module is provided. The remote-end module includes a signal I/O terminal, an I/O terminal set, an equalizer, a separating unit, a transforming unit and a processing unit. The signal I/O terminal receives a differential composite signal, which includes multiple differential data signals and a differential composition signal. The I/O terminal set includes a digital video differential signal output terminal, a keyboard control signal I/O terminal and a mouse control signal I/O terminal. The equalizer compensates the differential composite signal, and outputs the differential data signals to the digital video differential signal output terminal. The separating unit receives the differential synthesized signal of the differential composite signal, and further separates the differential synthesized signal into a differential clock signal and a differential hybrid signal and outputs the differential clock signal to the digital video differential signal output terminal. The transforming unit transforms the differential hybrid signal outputted from the separating unit into a digital hybrid data. The processing unit processes the digital hybrid data to obtain a low-frequency signal, a keyboard control signal and a mouse control signal, and respectively outputs the low-frequency signal, the keyboard control signal and the mouse control signal to the digital video differential signal output terminal, the keyboard control signal I/O terminal and the mouse control signal I/O terminal.

According to a sixth aspect of the present invention, a signal extender system is provided. The signal extender system includes a local-end module and a remote-end module. The local-end module transforms a digital video differential signal, a keyboard control signal and a mouse control signal, which are received from a corresponding host, into a differential composite signal. The remote-end module has a signal I/O terminal and an I/O terminal set. The signal I/O terminal is coupled to the local-end module via a network cable. The I/O terminal set is coupled to a console device. The local-end module outputs the differential composite signal to the signal I/O terminal via a network cable. The remote-end module transforms the differential composite signal into the digital video differential signal, the keyboard control signal and the mouse control signal, which are outputted to the console device via the I/O terminal set.

A management switch is provided and includes M dongle modules and a console module. M is a positive integer. Each dongle module is for transforming a digital video differential signal, and at least one peripheral signal, which are received from a corresponding host, into a differential composite signal. The console module is respectively coupled to the M dongle modules via M network cables. The console module is respectively coupled to N console devices. N is a positive integer. Each dongle module outputs the differential composite signal to the console module via the corresponding network cable, and the console module selects N differential composite signals from the M differential composite signals and transforms each differential composite signal into the digital video differential signal, and the at least one peripheral signal, which are outputted to the corresponding console device.

An extender is provided and includes a local-end module and a remote-end module. The local-end module is for transforming a digital video differential signal, and at least one peripheral signal, which are received from a corresponding host, into a differential composite signal. The local-end module receives and outputs the digital video differential signal to a local display device. The remote-end module is respectively coupled to the local-end module via a network cable. The remote-end module is coupled to a console device. The local-end module outputs the differential composite signal to the remote-end module via the network cable, and the remote-end module transforms the differential composite signal into the digital video differential signal, and the at least one peripheral signal, which are outputted to the console device.

An extender is provided and includes a first module and a second module. The first module is for transforming a digital video differential signal, which is received from a corresponding host, into a differential composite signal. The digital video differential signal includes a number of differential data signals, a differential clock signal and a low-frequency signal. The second module is coupled to the first module via a network cable. The second module is coupled to a console device. The first module outputs the differential composite signal to the second via the network cable, and the second module transforms the differential composite signal into the digital video differential signal, which is outputted to the console device.

The invention will become apparent from the following detailed description of the preferred but non-limiting embodiments. The following description is made with reference to the accompanying drawings.

DETAILED DESCRIPTION OF THE INVENTION

The invention provides a management switch and an extender. The management switch includes a dongle module, a console module, a matrix Keyboard-Video-Mouse (KVM) switch, and a video switch over one single network cable. The extender includes a local-end module, a remote-end module, a KVM extender, and a video extender over one single network cable. According to the invention, complete digital video differential signal is transmitted via one single network cable, so that the cost of the overall system is greatly reduced. The abovementioned digital video differential signal at least includes high definition multimedia interface (HDMI) signal, digital visual interface (DVI) signal and DisplayPort signal.

First Embodiment

Figure 1:
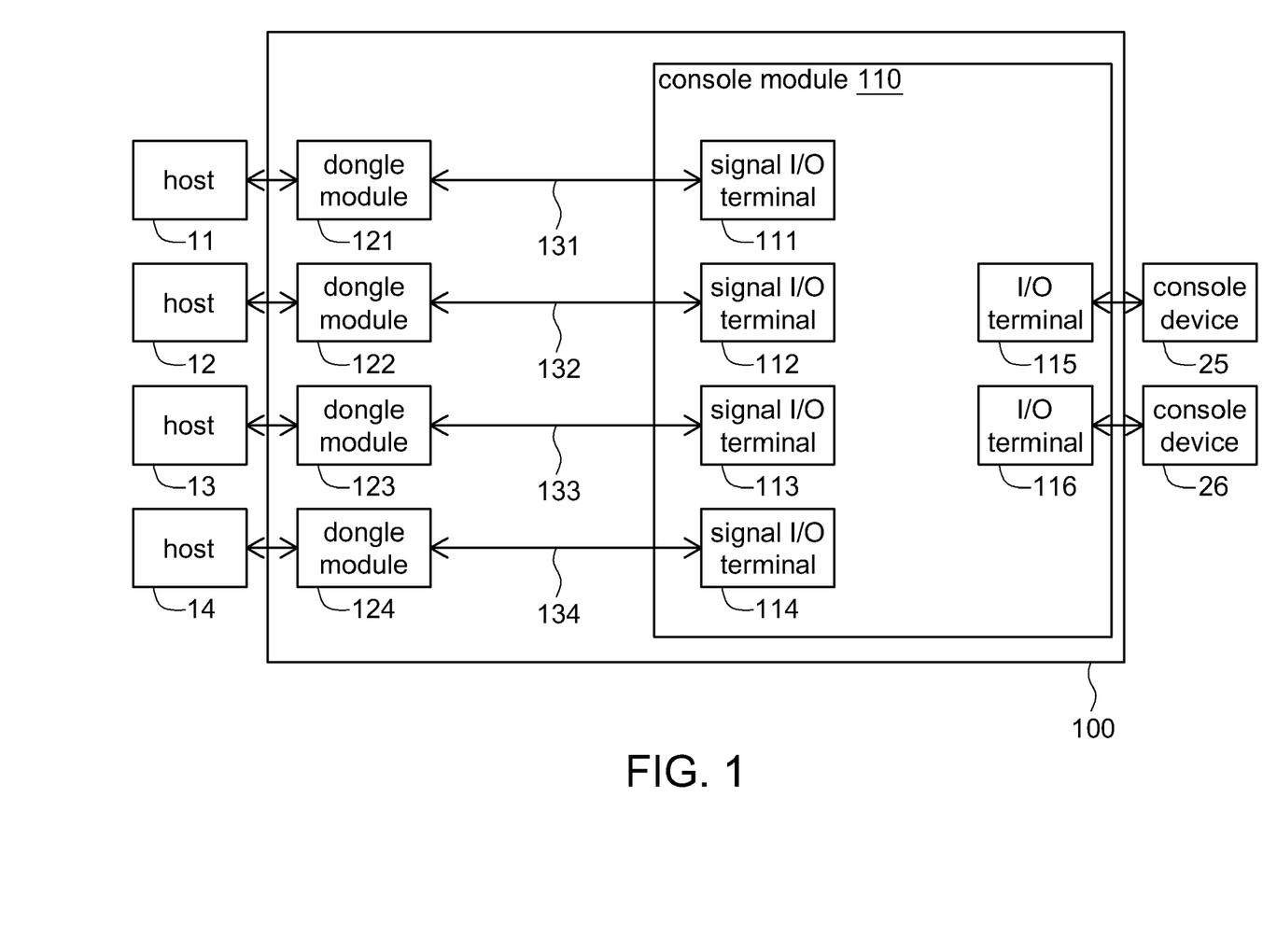
FIG. 1 shows a management switch according to a first embodiment of the invention.

Referring to FIG. 1, a management switch according to a first embodiment of the invention is shown. The management switch 100 includes M dongle modules and a console module 110. The console module 110 has M signal I/O terminals and N I/O terminal sets, wherein both M and N are a positive integer. In FIG. 1, M is exemplified by 4, N is exemplified by 2, the signal I/O terminal is exemplified by four signal I/O terminals 111~114 and the I/O terminal is exemplified by two I/O terminals 115~116, but the invention is not limited thereto.

The dongle modules 121~124 respectively transform a digital video differential signal, and at least one peripheral signal which are received from the corresponding hosts 11~14, into a differential composite signal. In one embodiment, the peripheral signal includes a keyboard control signal, a mouse control signal and an analog audio signal. The four signal I/O terminals 111~114 of the console module 110 are respectively coupled to the four dongle modules 121~124 via four network cables 131~134. The network cables 131~134 are unshielded twisted pair (UTP) cable including CAT5/5e/6/7 cable, but are not limited thereto. The network cables have four pairs of twisted lines. The two I/O terminal sets 115~116 of the console module 110 are respectively coupled to the two console devices 25~26, such as keyboard, mouse, display device (or touch control display device), microphone, and speaker. Furthermore, the console module 110 can be a matrix KVM switch or a video switch, and the console devices 25~26 can be two local console devices of the console module 110 (such as the matrix KVM switch or the video switch). In the present embodiment of the invention, the console module 110 can also be connected to a remote-end console module through at least a network cable, wherein the remote-end console module can also be connected to a remote-end console device, such as keyboard, mouse, display device (or touch control display device), microphone, and speaker. Thus, the remote-end console module and the local console module can respectively control the hosts 11~14 through the console module 110 and the dongle modules 121~124.

The dongle modules 121~124 respectively output the differential composite signal to the corresponding signal I/O terminals 111~114 via the corresponding network cables 131~134. The console module 110 selects two differential composite signals from four differential composite signals, and further transforms each differential composite signal into the digital video differential signal, the keyboard control signal, the mouse control signal and the analog audio signal, which are outputted to the corresponding console devices 25~26 via the corresponding I/O terminals 115~116. Furthermore, the console devices 25~26 can also respectively output at lease one peripheral signal including the keyboard control signal, the mouse control signal and the analog audio signal to the hosts 11~14 through the console module 110 and the dongle modules 121~124.

Figure 2:
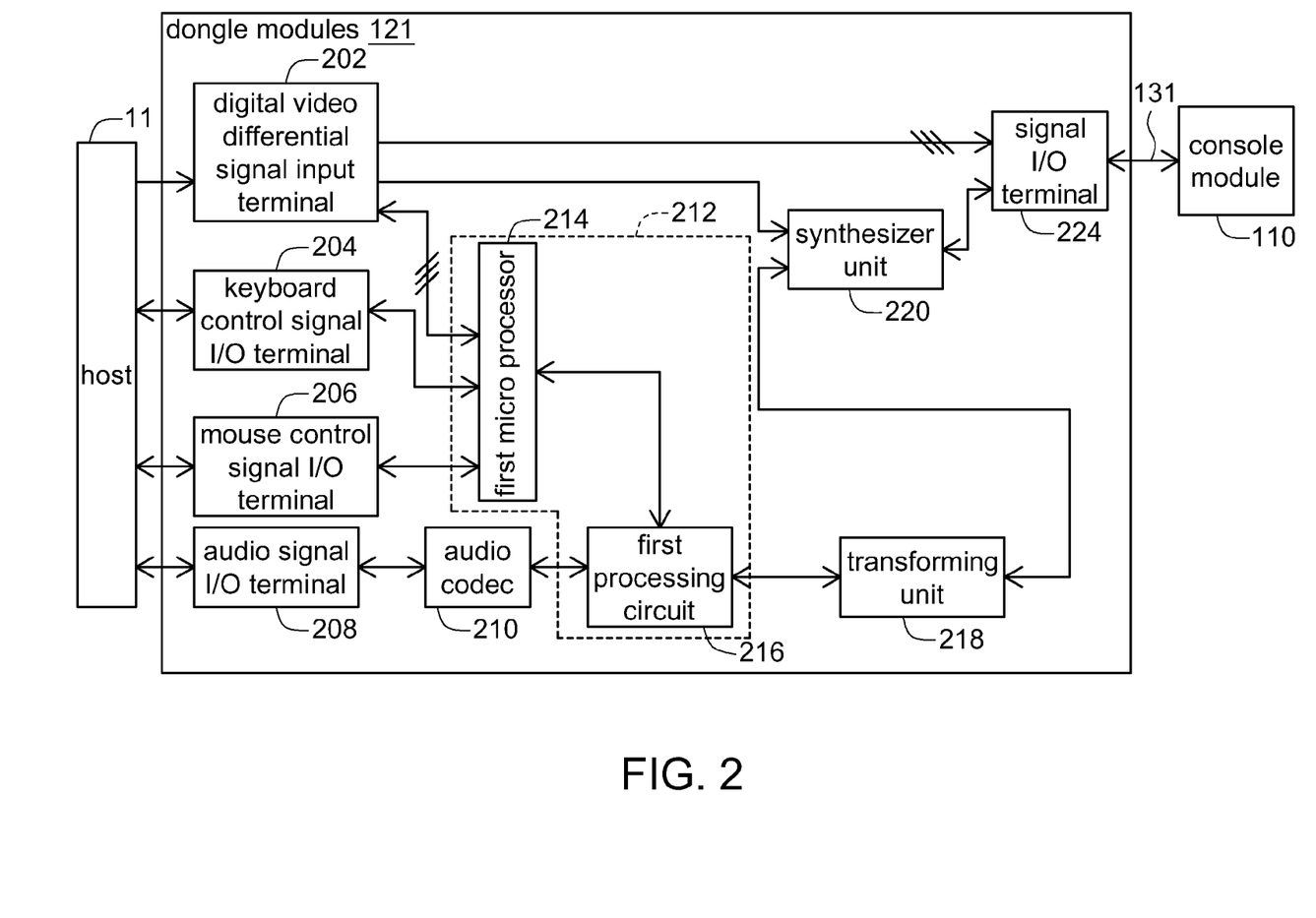
FIG. 2 shows a functional block diagram of a dongle module according to a first embodiment of the invention.

Referring to FIG. 2, a functional block diagram of a dongle module according to a first embodiment of the invention is shown. Let the dongle module 121 be taken for example. However, the invention is not limited thereto. The dongle module 121 includes a digital video differential signal input terminal 202, a keyboard control signal I/O terminal 204, a mouse control signal I/O terminal 206, an audio signal I/O terminal 208, an audio codec 210, a first processing unit 212, a transforming unit 218, a synthesizer unit 220 and a signal I/O terminal 224.

On the part of the dongle module 121, the digital video differential signal input terminal 202 receives a digital video differential signal outputted from the host 11, wherein the digital video differential signal includes multiple differential data signals, a differential clock signal and multiple low-frequency signals. The keyboard control signal I/O terminal 204 receives a keyboard control signal outputted from the host 11. The mouse control signal I/O terminal 206 receives a mouse control signal outputted from the host 11. The audio signal I/O terminal 208 receives an analog audio signal outputted from the host 11. The audio codec 210 further encodes the analog audio signal outputted from the audio signal I/O terminal 208 into a digital audio signal.

The first processing unit 212 processes the multiple low-frequency signals received from the digital video differential signal input terminal 202, the keyboard control signal received from the keyboard control signal I/O terminal 204, the mouse control signal received from the mouse control signal I/O terminal 206 and the digital audio signal received from the audio codec 210 to obtain a digital hybrid data. The first processing unit 212 includes a first micro processor (MCU) 214 and a first processing circuit 216. The first micro processor 214 receives and integrates the multiple low-frequency signals, the keyboard control signal and the mouse control signal into a digital integrated data and further outputs the digital integrated data to the first processing circuit 216. The first processing circuit 216, implemented by an application specific integrated circuit (ASIC), a field programmable gate array (FPGA) or a complex programmable logic device (CPLD) for example, mixes the digital integrated data outputted from the first micro processor 214 and the digital audio signal outputted from the audio codec 210 into a digital hybrid data and further outputs the digital hybrid data to the transforming unit 218. The digital integrated data and the digital hybrid data are package data.

The keyboard control signal I/O terminal 204 transmits the keyboard control signal between the host and the first micro processor 214. Furthermore, the mouse control signal I/O terminal 206 transmits the mouse control signal between the host and the first micro processor 214. Besides, the audio signal I/O terminal 208 transmits the audio signal between the host and audio codec 210. The first processing circuit 216 processes the signal outputted from the transforming unit 218 and respectively transmits the processed signal to the first micro processor 214 and the audio codec 210. The first micro processor 214 processes the signal outputted from the first processing circuit 216 and respectively transmits the processed signal to the keyboard control signal I/O terminal 204 and the mouse control signal I/O terminal 206 to further transmit the signal to the host. The audio codec 210 processes the signal outputted from the first processing circuit 216, and transmits the processed signal to the audio signal I/O terminal 208 to further transmits the signal to the host. In the present embodiment of the invention, if the host can output the digital audio signal, then the audio codec can be omitted, and the host can output the digital audio signal to the first processing circuit through the audio signal I/O terminal. Furthermore, the first processing circuit can also output the digital audio signal received from console device to the host through the audio signal I/O terminal.

The transforming unit 218 transforms the digital hybrid data received from the first processing circuit 216 into a differential hybrid signal. The synthesizer unit 220 substantially is a low-pass and high-pass filter composition circuit, which composes the high-frequency differential clock signal received from the digital video differential signal input terminal 202 and the low-frequency differential hybrid signal received from the transforming unit 218 into a differential synthesized signal. The frequency of the differential clock signal is higher than a first frequency, the frequency of the differential hybrid signal is lower than a second frequency, and the first frequency is higher than the second frequency, wherein the first frequency is 20 MHz for example, and the second frequency is 8 MHz for example. The signal I/O terminal 224 receives and outputs the differential data signals and the differential synthesized signal as a differential composite signal via the same one pair of twisted line of the network cable or different pairs of the twisted pairs of the network cable. In the present embodiment of the invention, the transforming unit 218 includes transforming elements such as RS485, RS232, RS422, RS423, low-voltage positive/pseudo emitter-coupled logic (LVPECL), voltage-mode logic (VML), current-mode logic (CML), low-voltage differential signaling (LVDS) and Ethernet.

The digital video differential signal substantially includes three groups of differential data signals, a differential clock signal and multiple low-frequency signals. The differential clock signal, the multiple low-frequency signals and other peripheral signals (such as keyboard control signal, mouse control signal, and audio signal) are composed into a differential synthesized signal, so the differential composite signal outputted from the signal I/O terminal 224 substantially includes four groups of differential signals (such as differential data signals and differential synthesized signal) for transmitting the differential composite signal to the console module 110 via the four pairs of twisted lines of one single network cable. That is, the complete digital video differential signal can be transmitted by one single network cable without using the HDMI cable or more than two network cables, hence reducing the cost of the overall system and increasing convenience in installation. In one embodiment, the differential clock signal, and the multiple low-frequency signals are composed into the differential synthesized signal. In other embodiments, the differential data signals and the synthesized signal are transmitted via the same pair of twisted line of the network cable or different pairs of twisted lines of the network cable. In another embodiment, the differential data signals and the synthesized signal are alternatively transmitted via at least one pair of twisted line of the network cable.

When the digital video differential signal is an HDMI signal, the three groups of differential data signals include signals such as TMDS D0-D2, and the multiple low-frequency signals include signals such as display data channel (DDC) signal, consumer electronics control (CEO) signal and hot plug detect (HPD) signal. Furthermore, when the digital video differential signal is a DVI signal, the three groups of differential data signals include signals such as TMDS D0-D2 signals, and the multiple low-frequency signals include signals such as a DDC signal and an HPD signal. Besides, when the digital video differential signal is a DisplayPort signal, the three groups of differential data signals include signals such as the Main Link Land 0-Land 1, and the multiple low-frequency signals include signals such as an auxiliary channel AUX CH+ signal, an auxiliary channel AUX CH− signal and an HPD signal. The Main Link is composed of 1~4 Lane sets, wherein each Lane set is composed of a pair of lines (two lines), and the signal employs serial differential technology (that is, the 0 and 1 of the binary system are denoted by the voltage difference between two lines).

Figure 3:
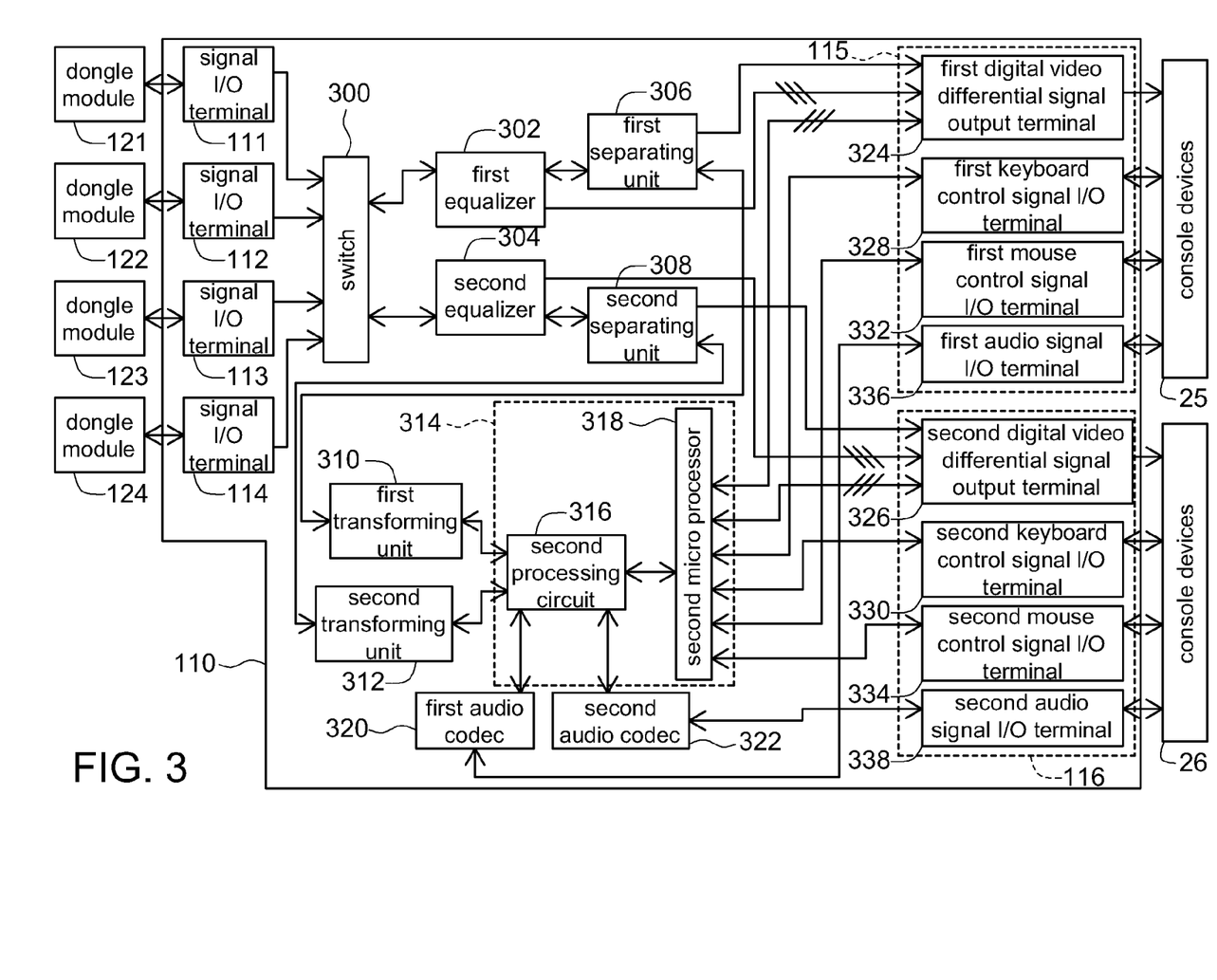
FIG. 3 shows a functional block diagram of a console module according to a first embodiment of the invention.

Referring to FIG. 3, a functional block diagram of a console module 110 according to a first embodiment of the invention is shown. The console module 110 includes four signal I/O terminals 111~114, two I/O terminal sets 115~116, a switch 300, a first equalizer 302, a second equalizer 304, a first separating unit 306, a second separating unit 308, a first transforming unit 310, a second transforming unit 312, a second processing unit 314, a first audio codec 320 and a second audio codec 322.

The four signal I/O terminals 111~114 correspondingly receive four differential composite signals from the network cables 131~134 respectively, wherein each differential composite signal includes multiple differential data signals and a differential synthesized signal. The first I/O terminal set 115 includes a first digital video differential signal output terminal 324, a first keyboard control signal I/O terminal 328, a first mouse control signal I/O terminal 332 and a first audio signal I/O terminal 336. The first digital video differential signal output terminal 324, the first keyboard control signal I/O terminal 328, the first mouse control signal I/O terminal 332 and the first audio signal I/O terminal 336 are respectively connected to the touch control display device, the display device, the keyboard, the mouse, the microphone, and the speaker of the console device 25. The second I/O terminal set 116 includes a second digital video differential signal output terminal 326, a second keyboard control signal I/O terminal 330, a second mouse control signal I/O terminal 334 and a second audio signal I/O terminal 338. The second digital video differential signal output terminal 326, the second keyboard control signal I/O terminal 330, the second mouse control signal I/O terminal 334 and the second audio signal I/O terminal 338 are respectively connected to the touch control display device, the display device, the keyboard, the mouse, the microphone, and the speaker of the console device 26.

The switch 330 selects two differential composite signals from the four differential composite signals received from the signal I/O terminals 111~114. The first equalizer 302 and the second equalizer 304 correspondingly compensate the two differential composite signals, and respectively output multiple differential data signals of the two differential composite signals to the corresponding first digital video differential signal output terminal 324 or the corresponding second digital video differential signal output terminal 326.

The first separating unit 306 and the second separating unit 308 correspondingly receive the differential synthesized signal of the differential composite signal from the first equalizer 302 and the second equalizer 304. The first separating unit 306 and the second separating unit 308 substantially are low-pass and high-pass filter circuits, respectively separating the received differential synthesized signal into a high-frequency differential clock signal and a low-frequency differential hybrid signal. The frequency of the differential clock signal is higher than a first frequency, the frequency of the differential hybrid signal is lower than a second frequency, the first frequency is higher than the second frequency, wherein the first frequency is 20 MHz for example, and the second frequency is 8 MHz for example. Then, the first separating unit 306 and the second separating unit 308 respectively output the differential clock signal generated by separation to the corresponding first digital video differential signal output terminal 324 or the second digital video differential signal output terminal 326.

The first transforming unit 310 and the second transforming unit 312 correspondingly transforms the differential hybrid signal outputted from the first separating unit 306 and the second separating unit 308 into a digital hybrid data. The second processing unit 314 receives the digital hybrid data, and further processes each digital hybrid data to obtain multiple low-frequency signals, the keyboard control signal, the mouse control signal and digital audio signal. The second processing unit 314 includes a second processing circuit 316 and a second micro processor 318. The second processing circuit 316 is implemented by an application specific integrated circuit (ASIC), a field programmable gate array (FPGA) or a complex programmable logic device (CPLD) for example. In the present embodiment of the invention, the first transforming unit 310 and the second transforming unit 312 include transforming elements such as RS485, RS232, RS422, RS423, LVPECL, VML, CML, LVDS and Ethernet.

The second processing circuit 316 respectively decodes the digital hybrid data received from the first transforming unit 310 and the second transforming unit 312 into a digital audio signal and a digital integrated data. The second micro processor 318 receives the digital integrated data, and further decodes each digital integrated data into multiple low-frequency signals, the keyboard control signal and the mouse control signal, which are respectively outputted to the corresponding first digital video differential signal output terminal 324 or the corresponding second digital video differential signal output terminal 326, the corresponding first keyboard control signal I/O terminal 328 or the corresponding second keyboard control signal I/O terminal 330, and the corresponding first mouse control signal I/O terminal 332 or the corresponding second mouse control signal I/O terminal 334. When the digital video differential signal is an HDMI signal, three groups of differential data signals include signals such as TMDS D0-D2 signals, and multiple low-frequency signals include signals such as DDC, CEC and HPD signals. Furthermore, when the digital video differential signal is a DVI signal, the three groups of differential data signals include signals such as TMDS D0-D2 signals, and multiple low-frequency signals include signals such as DDC, CEC and HPD signals. Besides, when the digital video differential signal is a DisplayPort signal, three groups of differential data signals include signals such as the Main Link Land 0-Land 1, and multiple low-frequency signals include signals such as the auxiliary channel AUX CH+ signal, the auxiliary channel AUX CH− signal and HPD signal.

The first mouse control signal I/O terminal 332 and the second mouse control signal I/O terminal 334 respectively transmit signals between the corresponding console device and the second micro processor 318. Furthermore, the first keyboard control signal I/O terminal 328 and the second keyboard control signal I/O terminal 330 respectively transmit signals between the corresponding console device and the second micro processor 318.

The first audio codec 320 and the second audio codec 322 correspondingly decode the digital audio signal received from the second processing circuit 316 into an analog audio signal which is outputted to the corresponding first audio signal I/O terminal 336 or the second audio signal I/O terminal 338. The digital video differential signal, the keyboard control signal, the mouse control signal and the analog audio signal which are received by the I/O terminals 115~116 are further respectively outputted to the corresponding console devices 25~26. The first audio signal I/O terminal 336 and the second audio signal I/O terminal 338 respectively transmit signals between the corresponding console device and the corresponding audio codec.

It is noted that, the second micro processor respectively processes the signals outputted from the two keyboard control signal I/O terminals and the two mouse control signal I/O terminals and further transmit the processed signal to the second processing circuit. The audio codec processes the signal outputted from the corresponding audio signal I/O terminal and further transmits the processed signal to the second processing circuit, and then the processed signal is further transmitted to the corresponding transforming unit. The second processing circuit processes the signal outputted from the second micro processor and outputs the processed signal to the corresponding transforming unit. In the present embodiment of the invention, if the console device can output the digital audio signal, then the audio codec can be omitted, and the second processing circuit can output the digital audio signal to the console device through the audio signal I/O terminal. Furthermore, the second processing circuit can also receive the digital audio signal from the console device through the audio signal I/O terminal.

Second Embodiment

Figure 4:
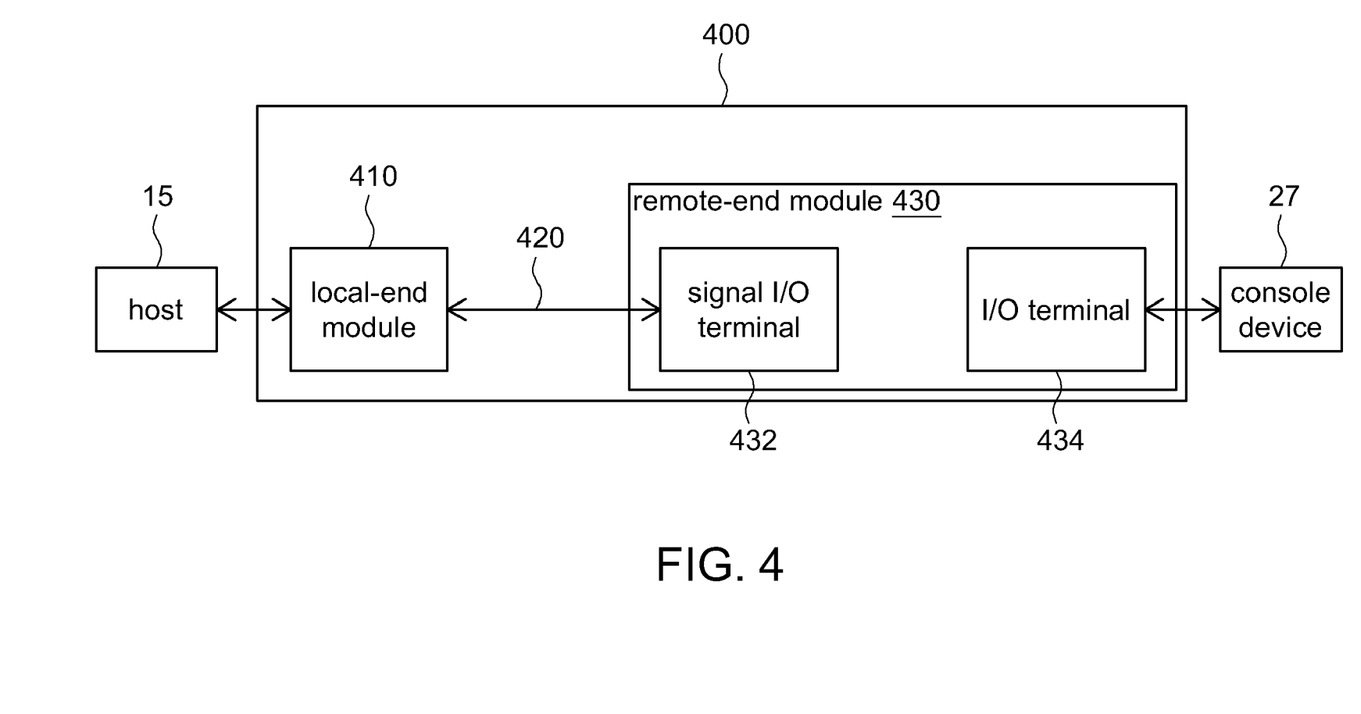
FIG. 4 shows an extender according to a second embodiment of the invention.

Referring to FIG. 4, an extender system according to a second embodiment of the invention is shown. Extender system 400 includes a local-end module 410 and a remote-end module 430. The local-end module 410 transforms a digital video differential signal, and at least one peripheral signal which are received from a corresponding host 15 into a differential composite signal. The network cable 420 is an unshielded twisted pair (UTP) cable including CAT5/5e/6/7 cable but is not limited thereto. In one embodiment, the peripheral signal includes a keyboard control signal, a mouse control signal and an analog audio signal.

The remote-end module 430 has a signal I/O terminal 432 and an I/O terminal 434. The signal I/O terminal 432 is coupled to the local-end module 410 via the network cable 420, and the I/O terminal 434 is coupled to a console device 27. The local-end module 410 outputs the differential composite signal to the signal I/O terminal 432 via the network cable 420. The remote-end module 430 transforms the differential composite signal into the digital video differential signal, the keyboard control signal, the mouse control signal and the analog audio signal, which are outputted to the console device 27 via the I/O terminal 434. The console device 27 includes a keyboard, mouse, a display device (or touch control display device), a microphone, and a speaker for example. Furthermore, the console device can further output at least one peripheral signal including the keyboard control signal, the mouse control signal and the analog audio signal to the host through the remote-end module and local-end module.

Figure 5:
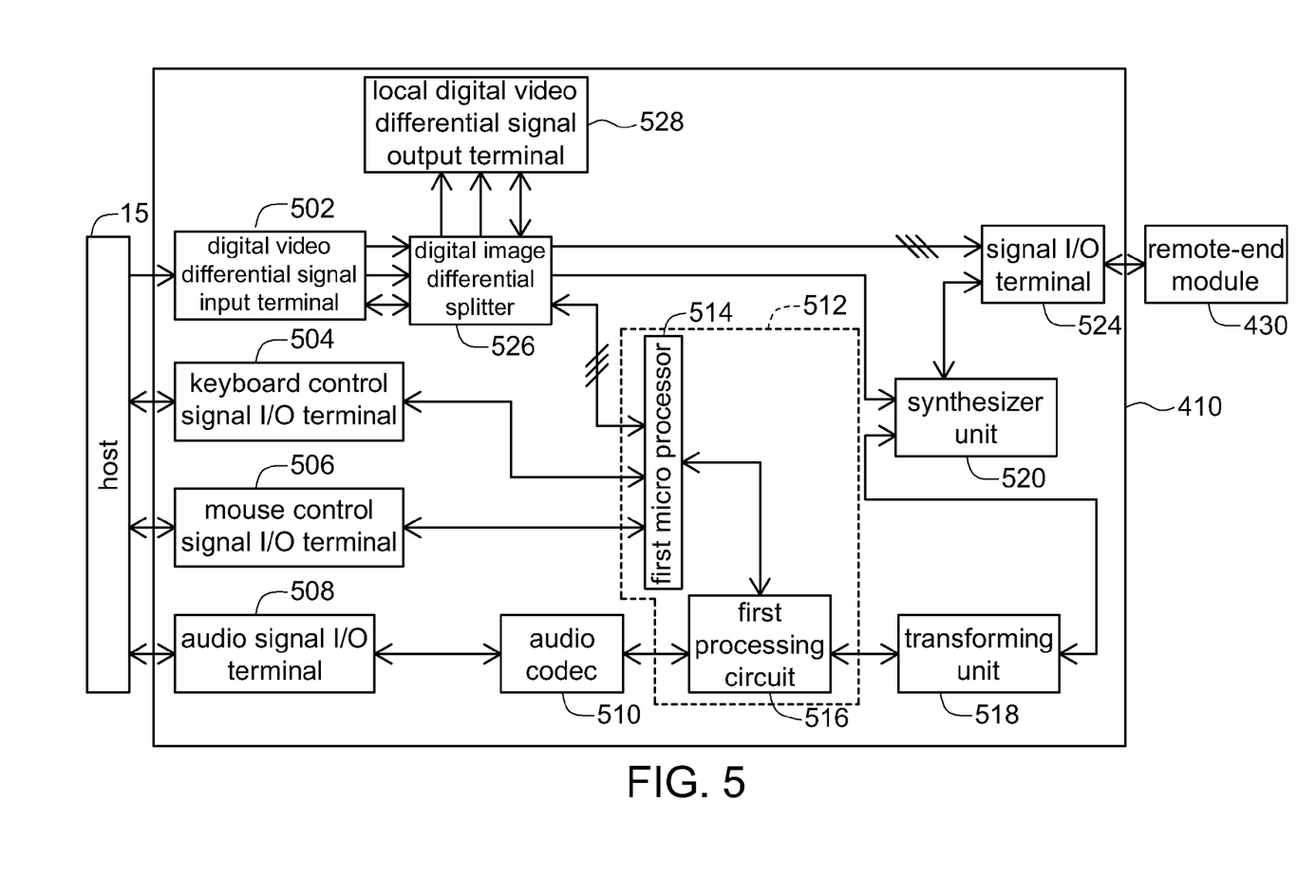
FIG. 5 shows a functional block diagram of a local-end module according to a second embodiment of the invention.

Referring to FIG. 5, a functional block diagram of a local-end module 410 according to a second embodiment of the invention is shown. The local-end module 410 includes a digital video differential signal input terminal 502, a keyboard control signal I/O terminal 504, a mouse control signal I/O terminal 506, an audio signal I/O terminal 508, an audio codec 510, a first processing unit 512, a transforming unit 518, a synthesizer unit 520, a signal I/O terminal 524, a digital video differential splitter 526 and a local digital video differential signal output terminal 528.

In the local-end module 410, the digital video differential signal input terminal 502 receives the digital video differential signal: the digital video differential signal includes multiple differential data signals, a differential clock signal and multiple low-frequency signals. When the digital video differential signal is an HDMI signal, the three groups of differential data signals include signals such as TMDS D0-D2 signals, and the multiple low-frequency signals include signals such as the DDC signal, the CEO signal and the HPD signal. Furthermore, when the digital video differential signal is a DVI signal, the three groups of differential data signals include signals such as TMDS D0-D2 signals, and the multiple low-frequency signals include signals such as DDC, CEO and HPD signals. Besides, when the digital video differential signal is a DisplayPort signal, the three groups of differential data signals include signals such as the Main Link Land 0-Land 1, and the multiple low-frequency signals include signals such as the auxiliary channel AUX CH+ signal, the auxiliary channel AUX CH− signal and HPD signal. The keyboard control signal I/O terminal 504 receives the keyboard control signal. The mouse control signal I/O terminal 506 receives the mouse control signal. The audio signal I/O terminal 508 receives the analog audio signal. The audio codec 510 decodes the analog audio signal received from the audio signal I/O terminal 508 into a digital audio signal. In the present embodiment of the invention, if the host can output the digital audio signal, then the audio codec can be omitted, and the host can output the digital audio signal to the first processing circuit through the audio signal I/O terminal. Furthermore, the first processing circuit can also output the digital audio signal received from console device to the host through the audio signal I/O terminal.

The first processing unit 512 processes multiple low-frequency signals received from the digital video differential signal input terminal 502, the keyboard control signal received from the keyboard control signal I/O terminal 504, the mouse control signal received from the mouse control signal I/O terminal 506 and the digital audio signal received from the audio codec 510 to obtain a digital hybrid data. The first processing unit 512 includes a first micro processor (MCU) 514 and a first processing circuit 516. The first micro processor 514 receives and integrates the multiple low-frequency signals, the keyboard control signal and the mouse control signal into a digital integrated data. The first processing circuit 516, implemented by an application specific integrated circuit (ASIC), a field programmable gate array (FPGA) or a complex programmable logic device (CPLD) for example, mixes the digital integrated data and digital audio signal into the digital hybrid data. The digital integrated data and the digital hybrid data are package data.

The transforming unit 518 transforms the digital hybrid data received from the first processing circuit 516 into a differential hybrid signal. The synthesizer unit 520, substantially being a low-pass and high-pass filter composition circuit, composes the high-frequency differential clock signal received from the digital video differential signal input terminal 502 and the low-frequency differential hybrid signal received from the transforming unit 518 into a differential synthesized signal. The frequency of the differential clock signal is higher than a first frequency, the frequency of the differential hybrid signal is lower than a second frequency, and the first frequency is higher than the second frequency, wherein the first frequency is 20 MHz for example, and the second frequency is 8 MHz for example. The signal I/O terminal 524 receives and outputs the differential data signals and the differential synthesized signal as a differential composite signal via the same one pair of twisted line of the network cable or different pairs of the twisted pairs of the network cable. In the present embodiment of the invention, the transforming unit 518 includes transforming elements such as RS485, RS232, RS422, RS423, LVPECL, VML, CML, LVDS and Ethernet.

Furthermore, the digital video differential splitter 526 is coupled to the digital video differential signal input terminal 502 for receiving the digital video differential signal. The local digital video differential signal output terminal 528 is coupled to the digital video differential splitter 526 for outputting the digital video differential signal received from digital video differential splitter 526 to a local display device (not illustrated).

The digital video differential signal substantially includes three groups of differential data signals, a differential clock signal and multiple low-frequency signals. The differential clock signal, multiple low-frequency signals and other peripheral signals (such as keyboard control signal, mouse control signal and audio signal) are composed into a differential synthesized signal, so the differential composite signal outputted from the signal I/O terminal 524 substantially includes four groups of differential signals (such as the differential data signals and the differential synthesized signal) for transmitting differential composite signal to the remote-end module 430 via the four pairs of twisted lines of the single network cable 420. That is, the complete digital video differential signal can be transmitted by one single network cable without using the HDMI cable or more than two network cables, hence reducing the cost of the overall system and increasing convenience in installation. In one embodiment, the differential clock signal, and the multiple low-frequency signals are composed into the differential synthesized signal. In other embodiment, the differential data signals and the synthesized signal are transmitted via the same pair of twisted line of the network cable or differential pairs of twisted lines of the network cable. In another embodiment, the differential data signals and the synthesized signal are alternatively transmitted via at least one pair of twisted line of the network cable.

Figure 6:
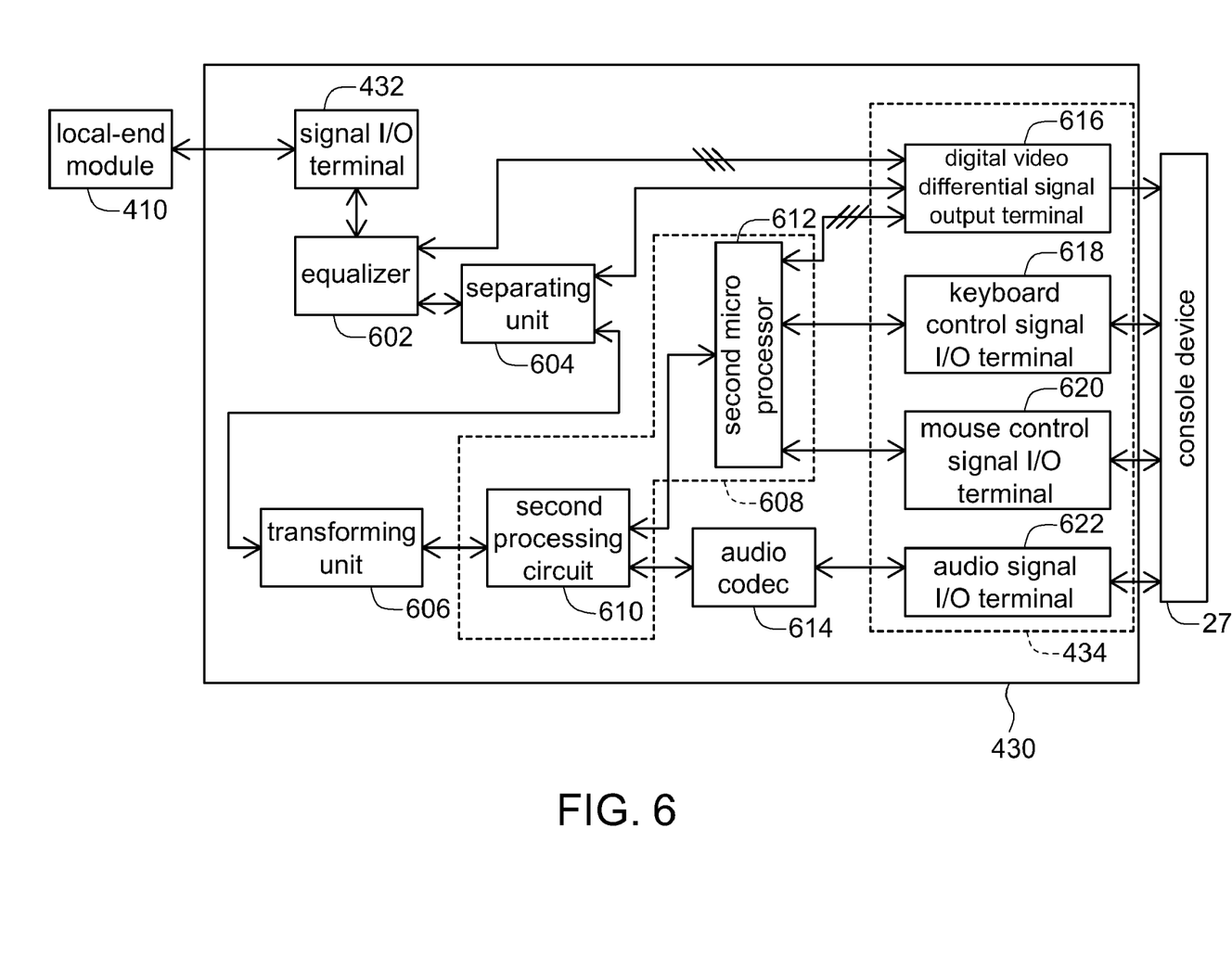
FIG. 6 shows a functional block diagram of a remote-end module according to a second embodiment of the invention.

Referring to FIG. 6, a functional block diagram of a remote-end module 430 according to a second embodiment of the invention is shown. The remote-end module 430 includes a signal I/O terminal 432, an I/O terminal 434, an equalizer 602, a separating unit 604, a transforming unit 606, a second processing unit 608, an audio codec 614. The signal I/O terminal 432 receives the differential composite signal from the network cable 420, wherein the differential composite signal includes multiple differential data signals and the differential synthesized signal. The I/O terminal 434 includes a digital video differential signal output terminal 616, a keyboard control signal I/O terminal 618, a mouse control signal I/O terminal 620 and an audio signal I/O terminal 622.

The equalizer 602 compensates the differential composite signal, and further outputs multiple differential data signals of the differential composite signal to the digital video differential signal output terminal 616. The separating unit 604 receives the differential synthesized signal of the differential composite signal from the equalizer 602. The separating unit 604, substantially being a low-pass and high-pass filter circuit, separates the received differential synthesized signal into a high-frequency differential clock signal and a the low-frequency differential hybrid signal. The frequency of the differential clock signal is higher than a first frequency, the frequency of the differential hybrid signal is lower than a second frequency, and the first frequency is higher than the second frequency, wherein the first frequency is 20 MHz for example, and the second frequency is 8 MHz for example. Then, the separating unit 604 outputs the differential clock signal obtained by separation to the digital video differential signal output terminal 616.

The transforming unit 606 transforms the differential hybrid signal outputted from the separating unit 604 into a digital hybrid data. The second processing unit 608 receives the digital hybrid data, and further processes the digital hybrid data to obtain multiple low-frequency signals, the keyboard control signal, the mouse control signal and digital audio signal. The second processing unit 608 includes a second processing circuit 610 and a second micro processor 612. The second processing circuit 610 is implemented by an application specific integrated circuit (ASIC), a field programmable gate array (FPGA) or a complex programmable logic device (CPLD) for example. In the present embodiment of the invention, the transforming unit 606 includes transforming elements such as RS485, RS232, RS422, RS423, LVPECL, VML, CML, LVDS and Ethernet.

The second processing circuit 610 decodes the digital hybrid data received from the transforming unit 606 into a digital audio signal and a digital integrated data. The second micro processor 612 receives the digital integrated data, and further decodes the digital integrated data into multiple low-frequency signals, the keyboard control signal and the mouse control signal, which are respectively outputted to the digital video differential signal output terminal 616, the keyboard control signal I/O terminal 618 and the mouse control signal I/O terminal 620. When the digital video differential signal is an HDMI signal, the three groups of differential data signals include signals such as TMDS D0-D2 signals, and the multiple low-frequency signals include signals such as the DDC signal, the CEC signal and the HPD signal. Furthermore, when the digital video differential signal is a DVI signal, the three groups of differential data signals include signals such as TMDS D0-D2 signals, and the multiple low-frequency signals include signals such as DDC, CEC and HPD signals. Besides, when the digital video differential signal is a DisplayPort signal, the three groups of differential data signals include signals such as the Main Link Land 0-Land 1, and the multiple low-frequency signals include signals such as the auxiliary channel AUX CH+ signal, the auxiliary channel AUX CH− signal and HPD signal. The audio codec 614 decodes the digital audio signal received from the second processing circuit 610 into an analog audio signal and further outputs the analog audio signal to the audio signal I/O terminal 622. The I/O terminal 434 outputs the received signals including the digital video differential signal, the keyboard control signal, the mouse control signal and the analog audio signal to the console device 27. The audio signal I/O terminal transmits signals between the console device and the audio codec. Furthermore, the mouse control signal I/O terminal transmits signals between the corresponding console device and the second micro-processor. Furthermore, the keyboard control signal I/O terminal transmits signals between the console device and the second micro-processor.

It is noted that, the second micro processor respectively processes the signals outputted from the keyboard control signal I/O terminal and the mouse control signal I/O terminal and further transmit the processed signal to the second processing circuit. The audio codec processes the signal outputted from the audio signal I/O terminal and further transmits the processed signal to the second processing circuit, and then the processed signal is further transmitted to the transforming unit. The second processing circuit processes the signal outputted from the second micro processor and outputs the processed signal to the corresponding transforming unit. In the present embodiment of the invention, if the console device can output the digital audio signal, then the audio codec can be omitted, and the second processing circuit can output the digital audio signal to the console device through the audio signal I/O terminal. Furthermore, the second processing circuit can also receive the digital audio signal from the console device through the audio signal I/O terminal.

According to the management switch and the extender disclosed in the above embodiments of the invention, the differential clock signals of the digital video differential signal, the multiple low-frequency signals and other signals are composed into a differential composition signal. Therefore, the differential composite signal including the differential composition signal and three groups of differential data signals can be transmitted via the four pairs of twisted lines of one single network cable. That is, the complete digital video differential signal can be transmitted by one single network cable without using the HDMI cable or more than two network cables, hence reducing the cost of the overall system and increasing convenience in installation.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A management switch, comprising:
    M dongle modules, each transforming a digital video differential signal, and at least one peripheral signal, which are received from a corresponding host, into a differential composite signal, wherein M is a positive integer; and
    a console module respectively coupled to the M dongle modules via M network cables, wherein the console module is respectively coupled to N console devices, and N is a positive integer;
    wherein, each dongle module outputs the differential composite signal to the console module via the corresponding network cable, and the console module selects N differential composite signals from the M differential composite signals and transforms each differential composite signal into the digital video differential signal, and the at least one peripheral signal, which are outputted to the corresponding console device,
    wherein the at least one peripheral signal includes a keyboard control signal, and a mouse control signal, wherein each dongle module comprises:
    a digital video differential signal input terminal for receiving the digital video differential signal, which comprises a plurality of differential data signals, a differential clock signal and a low-frequency signal;
    a first keyboard control signal I/O terminal for receiving the keyboard control signal;
    a first mouse control signal I/O terminal for receiving the mouse control signal;
    a first processing unit for processing the low-frequency signal, the keyboard control signal and the mouse control signal to obtain a digital hybrid data;
    a first transforming unit for transforming the digital hybrid data into a differential hybrid signal;
    a synthesizer unit for receiving and composing the differential clock signal and the differential hybrid signal into a differential synthesized signal; and
    a first signal I/O terminal for receiving and outputting the differential data signals and the differential site synthesized signal into the differential composite signal.

2. The management switch according to claim 1, wherein the console module comprises:
    M second signal I/O terminals for correspondingly receiving the M differential composite signals, each comprising the differential data signals and the differential synthesized signal;
    N I/O terminal sets, each comprising a digital video differential signal output terminal, a second keyboard control signal I/O terminal and a second mouse control signal I/O terminal;
    a switch for selecting N differential composite signals from the M differential composite signals;
    N equalizers for correspondingly compensating the N selected differential composite signals and respectively outputting the differential data signals of the N differential composite signals to the digital video differential signal output terminal of the corresponding I/O terminal set;

N separating units for correspondingly receiving the N differential synthesized signals of the N differential composite signals from the N equalizers, respectively separating the received differential synthesized signal into the differential clock signal and the differential hybrid signal, and outputting the differential clock signal to the digital video differential signal output terminal of the corresponding I/O terminal set;

N second transforming units for correspondingly transforming the N differential hybrid signals outputted from the N separating units into the N digital hybrid data; and a second processing unit for receiving the N digital hybrid data and processing each digital hybrid data to obtain the low-frequency signal, the keyboard control signal and the mouse control signal and respectively outputting the low-frequency signal, the keyboard control signal and the mouse control signal to the digital video differential signal output terminal, the second keyboard control signal I/O terminal and the second mouse control signal I/O terminal of the corresponding I/O terminal set.

3. The management switch according to claim 2, wherein the at least one peripheral signal further includes an analog audio signal, each dongle module further transforms the digital video differential signal, the keyboard control signal, the mouse control signal and the analog audio signal into the differential composite signal, and the console module further transforms the differential composite signal into the digital video differential signal, the keyboard control signal, the mouse control signal and the analog audio signal;

wherein each dongle module further comprises:
 a first audio signal I/O terminal for receiving the analog audio signal; and
 a first audio codec for encoding the analog audio signal into a digital audio signal;

wherein, the first processing unit further processes the low-frequency signal, the keyboard control signal, the mouse control signal and the digital audio signal to obtain the digital hybrid data;

wherein each of the N I/O terminal sets further comprises a second audio signal I/O terminal, the console module further comprises:
 N second audio codecs for correspondingly decoding the N digital audio signals into the N analog audio signals, which are outputted to the second audio signal I/O terminal of the corresponding I/O terminal set;

wherein the second processing unit further processes the digital hybrid data to obtain the low-frequency signal, the keyboard control signal, the mouse control signal and the digital audio signal.

4. The management switch according to claim 2, wherein the differential clock signal is a high-frequency signal, the differential hybrid signal is a low-frequency signal, and the synthesizer unit is a first low-pass and high-pass filter composition circuit for composing the differential clock signal and the differential hybrid signal into the differential synthesized signal;

wherein each separating unit is a second low-pass and high-pass filter circuit for separating the received differential synthesized signal into the differential clock signal and the differential hybrid signal;

wherein the frequency of the high-frequency signal is higher than the frequency of the low-frequency signal.

5. The management switch according to claim 2, wherein the digital video differential signal is an HDMI, DVI or a DisplayPort signal;

wherein at least one of the first and second transforming units is a transforming element such as RS485, RS232, RS422, RS423, LVPECL, voltage-mode logic (VML), current-mode logic (CML), low-voltage differential signaling (LVDS) or Ethernet;

wherein the low-frequency signal is a DDC signal, a CEO signal, an HPD signal, an auxiliary channel AUX CH+ signal or an auxiliary channel AUX CH− signal.

6. An extender, comprising:
a local-end module for transforming a digital video differential signal, and at least one peripheral signal, which are received from a corresponding host, into a differential composite signal, wherein the local-end module receives and outputs the digital video differential signal to a local display device; and a remote-end module coupled to the local-end module via a network cable, wherein the remote-end module is coupled to a console device;

wherein the local-end module outputs the differential composite signal to the remote-end module via the network cable, and the remote-end module transforms the differential composite signal into the digital video differential signal, and the at least one peripheral signal, which are outputted to the console device, wherein the at least one peripheral signal includes a keyboard control signal, and a mouse control signal, wherein the local-end module comprises:

a digital video differential signal input terminal for receiving a digital video differential signal, which comprises a plurality of differential data signals, a differential clock signal and a low-frequency signal;

a first keyboard control signal I/O terminal for receiving the keyboard control signal;

a first mouse control signal I/O terminal for receiving the mouse control signal;

a first processing unit for processing the low-frequency signal, the keyboard control signal and the mouse control signal to obtain a digital hybrid data;

a first transforming unit for transforming the digital hybrid data into a differential hybrid signal;

a synthesizer unit for receiving and composing the differential clock signal and the differential hybrid signal into a differential synthesized signal;

a first signal I/O terminal for receiving and outputting the differential data signals and the differential synthesized signal as the differential composite signal;

a digital video differential splitter coupled to the digital video differential signal input terminal for receiving the digital video differential signal; and a local digital video differential signal output terminal coupled to the digital video differential splitter for receiving the digital video differential signal, which is outputted to the local display device.

7. The extender according to claim 6, wherein the remote-end module comprises:
a second signal I/O terminal for receiving the differential composite signal, which comprises the differential data signals and the differential composition signal;

an I/O terminal set comprising a digital video differential signal output terminal, a second keyboard control signal I/O terminal and a second mouse control signal I/O terminal; an equalizer for compensating the differential composite signal and outputting the differential data signals to the digital video differential signal output terminal of the I/O terminal set;

a separating unit for receiving the differential synthesized signal of the differential composite signal, separating the differential synthesized signal into the differential clock signal and the differential hybrid signal, and outputting the differential clock signal to the digital video differential signal output terminal of the I/O terminal set;
a second transforming unit for transforming the differential hybrid signal outputted from the separating unit into the digital hybrid data; and
a second processing unit for processing the digital hybrid data to obtain the low-frequency signal, the keyboard control signal and the mouse control signal, and respectively outputting the low-frequency signal, the keyboard control signal and the mouse control signal to the digital video differential signal output terminal, the second keyboard control signal I/O terminal and the second mouse control signal I/O terminal of the I/O terminal set.

8. The extender according to claim 7, wherein the at least one peripheral signal further includes an analog audio signal, the local-end module further transforms the digital video differential signal, the keyboard control signal, the mouse control signal and the analog audio signal into the differential composite signal, and the remote-end module further transforms the differential composite signal into the digital video differential signal, the keyboard control signal, the mouse control signal and the analog audio signal;
wherein the local-end module further comprises:
a first audio signal I/O terminal for receiving the analog audio signal; and
a first audio codec for encoding the analog audio signal into a digital audio signal;
wherein, the first processing unit further processes the low-frequency signal, the keyboard control signal, the mouse control signal and the digital audio signal to obtain the digital hybrid data;
wherein the I/O terminal set further comprises a second audio signal I/O terminal, the remote-end module further comprises:
a second audio codec for decoding the digital audio signal into the analog audio signal, which is outputted the second audio signal I/O terminal;
wherein the second processing unit further processes the digital hybrid data to obtain the low-frequency signal, the keyboard control signal, the mouse control signal and the digital audio signal.

9. The extender according to claim 7, wherein the differential clock signal is a high-frequency signal, the differential hybrid signal is a low-frequency signal, the synthesizer unit is a first low-pass and high-pass filter composition circuit for composing the differential clock signal and the differential hybrid signal into the differential synthesized signal;
wherein the separating unit is a second low-pass and high-pass filter circuit for separating the differential synthesized signal into the differential clock signal and the differential hybrid signal, the differential clock signal is a high-frequency signal, and the differential hybrid signal is a low-frequency signal;
wherein the frequency of the high-frequency signal is higher than the frequency of the low-frequency signal.

10. The extender according to claim 7, wherein the digital video differential signal is an HDMI signal, a DVI signal or a DisplayPort signal;
wherein at least one of the first and second transforming units is a transforming element such as RS485, RS232, RS422, RS423, LVPECL, VML, CML, LVDS or Ethernet;
wherein the low-frequency signal is a DDC signal, a CEO signal, an HPD signal, an auxiliary channel AUX CH+ signal or an auxiliary channel AUX CH− signal.

11. An extender, comprising:
a first module for transforming a digital video differential signal, which is received from a corresponding host, into a differential composite signal, wherein the digital video differential signal includes a plurality of differential data signals, a differential clock signal and a low-frequency signal; and
a second module coupled to the first module via a network cable, wherein the second module is coupled to a console device;
wherein the first module outputs the differential composite signal to the second module via the network cable, and the second module transforms the differential composite signal into the digital video differential signal, which is outputted to the console device,
wherein the first module further transforms the digital video differential signal, and at least one peripheral signal into the differential composition signal, where the at least one peripheral signal includes a keyboard control signal, and a mouse control signal, wherein the first module comprises:
a digital video differential signal input terminal for receiving a digital video differential signal, which comprises a plurality of differential data signals, a differential clock signal and a low-frequency signal;
a first keyboard control signal I/O terminal for receiving the keyboard control signal;
a first mouse control signal I/O terminal for receiving the mouse control signal;
a first processing unit for processing the low-frequency signal, the keyboard control signal and the mouse control signal to obtain a digital hybrid data;
a first transforming unit for transforming the digital hybrid data into a differential hybrid signal;
a synthesizer unit for receiving and composing the differential clock signal and the differential hybrid signal into a differential synthesized signal; and
a first signal I/O terminal for receiving and outputting the differential data signals and the differential synthesized signal as the differential composite signal.

12. The extender according to claim 11, wherein the second module comprises:
a second signal I/O terminal for receiving the differential composite signal, which comprises the differential data signals and the differential composition signal;
an I/O terminal set comprising a digital video differential signal output terminal, a second keyboard control signal I/O terminal and a second mouse control signal I/O terminal;
an equalizer for compensating the differential composite signal and outputting the differential data signals to the digital video differential signal output terminal of the I/O terminal set;
a separating unit for receiving the differential synthesized signal of the differential composite signal, separating the differential synthesized signal into the differential clock signal and the differential hybrid signal, and outputting the differential clock signal to the digital video differential signal output terminal of the I/O terminal set;
a second transforming unit for transforming the differential hybrid signal outputted from the separating unit into the digital hybrid data; and
a second processing unit for processing the digital hybrid data to obtain the low-frequency signal, the keyboard control signal and the mouse control signal, and respectively outputting the low-frequency signal, the keyboard control signal and the mouse control signal to the digital video differential signal output terminal, the second keyboard control signal I/O terminal and the second mouse control signal I/O terminal of the I/O terminal set.

13. The extender according to claim 12, wherein the at least one peripheral signal further includes an analog audio signal, the first module further transforms the digital video differential signal, the keyboard control signal, the mouse control signal and the analog audio signal into the differential composite signal, and the second module further transforms the differential composite signal into the digital video differential signal, the keyboard control signal, the mouse control signal and the analog audio signal;

wherein the first module further comprises:
a first audio signal I/O terminal for receiving the analog audio signal; and
a first audio codec for encoding the analog audio signal into a digital audio signal;
wherein, the first processing unit further processes the low-frequency signal, the keyboard control signal, the mouse control signal and the digital audio signal to obtain the digital hybrid data;
wherein the I/O terminal set further comprises a second audio signal I/O terminal, the second module further comprises:
a second audio codec for decoding the digital audio signal into the analog audio signal, which is outputted the second audio signal I/O terminal;
wherein the second processing unit further processes the digital hybrid data to obtain the low-frequency signal, the keyboard control signal, the mouse control signal and the digital audio signal.

14. The extender according to claim 12, wherein the differential clock signal is a high-frequency signal, the differential hybrid signal is a low-frequency signal, the synthesizer unit is a first low-pass and high-pass filter composition circuit for composing the differential clock signal and the differential hybrid signal into the differential synthesized signal;

wherein the separating unit is a second low-pass and high-pass filter circuit for separating the differential synthesized signal into the differential clock signal and the differential hybrid signal, the differential clock signal is a high-frequency signal, and the differential hybrid signal is a low-frequency signal;
wherein the frequency of the high-frequency signal is higher than the frequency of the low-frequency signal.

15. The extender according to claim 12, wherein the digital video differential signal is an HDMI signal, a DVI signal or a DisplayPort signal;

wherein at least one of the first and second transforming units is a transforming element such as RS485, RS232, RS422, RS423, LVPECL, VML, CML, LVDS or Ethernet;

wherein the low-frequency signal is a DDC signal, a CEO signal, an HPD signal, an auxiliary channel AUX CH+ signal or an auxiliary channel AUX CH− signal.

16. The extender according to claim 12, where the differential data signals and the differential synthesized signal are transmitted, via the same pair of twisted lines of the network cable, between the first and second modules.

17. The extender according to claim 12, where the differential data signals and the differential synthesized signal are transmitted, via different pairs of twisted lines of the network cable, between the first and second modules.

18. A management switch, comprising:
M dongle modules, each transforming a digital video differential signal, and at least one peripheral signal, which are received from a corresponding host, into a differential composite signal, wherein M is a positive integer; and
a console module respectively coupled to the M dongle modules via M network cables, wherein the console module is respectively coupled to N console devices, and N is a positive integer;
wherein, each dongle module outputs the differential composite signal to the console module via the corresponding network cable, and the console module selects N differential composite signals from the M differential composite signals and transforms each differential composite signal into the digital video differential signal, and the at least one peripheral signal, which are outputted to the corresponding console device,
wherein each dongle module comprises:
a digital video differential signal input terminal for receiving the digital video differential signal, which comprises a plurality of differential signals and a low-frequency signal;
a first peripheral signal I/O terminal for receiving the at least one peripheral signal;
a first processing unit for processing the low-frequency signal and the at least one peripheral signals to obtain a digital hybrid data;
a first transforming unit for transforming the digital hybrid data into a differential hybrid signal;
a synthesizer unit for receiving and composing one of the plurality of differential signal and the differential hybrid signal into a differential synthesized signal; and
a first signal I/O terminal for receiving and outputting the differential data signals and the differential synthesized signal into the differential composite signal.

19. The management switch of claim 18, wherein the differential signal synthesized with the differential hybrid signal is a differential clock signal.

* * * * *